(12) United States Patent
Cheng

(10) Patent No.: US 7,345,963 B2
(45) Date of Patent: Mar. 18, 2008

(54) METHOD AND RELATED APPARATUS FOR DERIVING A TRACKING ERROR SIGNAL

(75) Inventor: Yuh Cheng, Hsin-Chu Hsien (TW)

(73) Assignee: MediaTek Inc., Hsin-Chu Hsien (TW)

( * ) Notice: Subject to any disclaimer, the term of this patent is extended or adjusted under 35 U.S.C. 154(b) by 0 days.

(21) Appl. No.: 11/466,109

(22) Filed: Aug. 22, 2006

(65) Prior Publication Data

US 2006/0291345 A1    Dec. 28, 2006

Related U.S. Application Data

(62) Division of application No. 10/707,606, filed on Dec. 23, 2003, now Pat. No. 7,187,629.

(30) Foreign Application Priority Data

Apr. 7, 2003    (TW) ............................ 92107925 A

(51) Int. Cl.
*G11B 7/00* (2006.01)
(52) U.S. Cl. ................. 369/44.25; 369/44.27
(58) Field of Classification Search ............. 369/44.25, 369/44.27
See application file for complete search history.

(56) References Cited

U.S. PATENT DOCUMENTS

| | | | |
|---|---|---|---|
| 4,057,833 A | 11/1977 | Braat | |
| 4,785,441 A | 11/1988 | Tanaka | |
| 5,155,716 A * | 10/1992 | Imanaka et al. | 369/44.32 |
| 5,181,195 A | 1/1993 | Kume | |
| 5,808,979 A | 9/1998 | Ishibashi | |
| 6,134,197 A | 10/2000 | Ishibashi et al. | |
| 6,137,755 A * | 10/2000 | Bakx et al. | 369/44.34 |
| 6,266,305 B1 | 7/2001 | Buchler | |
| 6,804,187 B2 | 10/2004 | Miyanabe | |
| 6,937,547 B2 | 8/2005 | Nomoto | |
| 6,977,982 B2 * | 12/2005 | Ma et al. | 375/375 |
| 7,161,877 B2 | 1/2007 | Lai | |
| 2004/0151089 A1 | 8/2004 | Buchler et al. | |
| 2004/0160866 A1 | 8/2004 | Huang et al. | |
| 2005/0015687 A1 | 1/2005 | Lai et al. | |
| 2005/0068864 A1 | 3/2005 | Ma | |

* cited by examiner

*Primary Examiner*—Wayne Young
*Assistant Examiner*—Linh T. Nguyen
(74) *Attorney, Agent, or Firm*—Winston Hsu

(57) ABSTRACT

A method for deriving a tracking error signal based on a first analog detection signal and a second analog detection signal. The method includes summing the first analog detection signal and the second analog detection signal to generate an analog sum signal. An analog delay device is utilized to delay the analog sum signal to be a delay signal. The delay signal is digitalized into a digital delay signal. The first analog detection signal and the second analog detection signal are respectively transformed into a first digital detection signal and a second digital detect signal. The tracking error signal is then generated utilizing a comparing operation among the digital delay signal, the first digital detect signal, and the first digital detect signal.

9 Claims, 12 Drawing Sheets

METHOD AND RELATED APPARATUS FOR DERIVING A TRACKING ERROR SIGNAL

CROSS REFERENCE TO RELATED APPLICATIONS

This is a division of application Ser. No. 10/707,606 filed Dec. 23, 2003, now U.S. Pat. No. 7,187,629 from which the specification and drawings are carried forward without amendment and which is included herein by reference.

BACKGROUND OF THE INVENTION

1. Field of the Invention

The invention relates to a method for deriving a tracking error signal in an optical storage system, and more particularly, to a method for deriving a tracking error signal based on a first analog detection signal and a second analog detection signal.

2. Description of the Prior Art

An optical pick-up head, which is used to access data, plays an important role in various optical storage systems. Taking an optical drive as an example, the basic infrastructure of the optical drive can be seen in FIG. 1, which is a schematic diagram of a typical optical drive 10. The typical optical drive 10 includes a pick-up head 12, a spinning motor 14, and a movement stage 16. The pick-up head 12 is used to focus an optical beam 18 on a surface of a recording carrier 20 (an optical disk) to form an optical spot whose area is close to the data area of the optical disk 20. The spinning motor 14 rotates the optical disk 20.

Ideally, the optical spot propagates along a track direction on the optical disk 20 to form an optical spot trace 22 to access data on the optical disk 20. The pick-up head 12 is connected to the movement stage 16, and the movement stage 16 can assist the pick-up head 12 to seek tracks, so that the pick-up head 12 can move appropriately to a target track on the optical disk 20 to read or to write data. Taking a data-reading process as a brief example, after the optical beam emitted from the pick-up head 12 is reflected and refracted from an information plane of the optical disk 20, an optical sensor will receive the reflected (refracted) light. According to the different areas on the optical disk 20 respectively representing 0 and 1, the reflected light will show different optical intensities. The optical sensor will transform the reflected light of the different optical intensities into corresponding voltage signals.

When the optical drive 10 operates, the optical disk 20 is rotated at a very high frequency. Operating characteristics of the optical disk 20 in such circumstances are prone to be highly temperature-dependent and external-force-dependent. In addition, due to the optical disk 20 being a detachably installed recording carrier, the rotating center of the optical disk 20 may deviate from the predetermined center of rotation, so that the optical disk 20 may operate unstably, causing focus errors and tracking errors. Therefore, the pick-up head 12 is required to lock the optical spot along the desired data track on the optical disk 20 to accurately and quickly access data.

Moreover, the optical disk 20 shown in FIG. 1 is used to store high-density data, so that the width of the data tracks and distance between the data tracks are both very short. Therefore, any deviation from the data track will lead to incorrect data accessing. When being practically implemented, the optical spot emitted from the optical pick-up head should be perfectly located at the data track.

Please refer to FIG. 2, which is a schematic diagram showing a spatial relationship between a data track on the optical disk 20 shown in FIG. 1 and an optical sensor 30 of the pick-up head 12. A plurality of pits 32 of different lengths are strewn along the data track. An arrow mark 34 shown in FIG. 2 represents a track direction of the data track on the optical disk 20, and the optical sensor 30 of the pick-up head 12 moves and accesses data along the arrow mark 34 on the optical disk 20. The optical sensor 30 is a four-dimensional sensor, including a section A, a section B, a section C, and a section D. When each pit 32 on the data track passes through the optical sensor 30 of the pick-up head 12, the optical sensor 30 can be used to receive the optical beam 18 reflected and refracted from the pit 32. A tracking error signal TE and a focus error signal FE are generated according to four received different portions in space of the optical beam 18 respectively corresponding to the four sections (the section A, the section B, the section C, and the section D) of the optical sensor 30. The tracking error signal TE represents a deviation of the optical spot away from the data track. The focus error signal FE represents a distance between a focal point of the optical beam 18 shown in FIG. 1 and the information plane of the optical disk 20. According to the tracking error signal TE and the focus error signal FE, the position of the optical pick-up head 12 can be dynamically adjusted. Some prior art patents whose subject is aimed at generating the tracking error signal TE based on the above-mentioned optical sensor 30 are discussed below.

In U.S. Pat. No. 4,057,833, "Centering detection system for an apparatus for playing optically readable recording carriers", Braat et al. utilize an allanalog technique to generate a plurality of corresponding output signals according to the plurality of portions of the optical beam. Braat et al. then make use of time differences or phase differences among those output signals to generate the tracking error signal TE.

For increasing the accuracy of generated signals, Bakx et al. teach an alldigital approach to process data in U.S. Pat. No. 6,137,755, "Deriving a tracking error signal from a time difference between detector signals". Regarding the structure disclosed by Bakx et al, please refer to FIG. 3, which is a functional block diagram of a tracking error signal generator 40 according to the prior art. As shown in FIG. 3, the tracking error signal generator 40 includes two signal input ports (a first signal input port 42 and a second signal input port 44), two digitizers (a first digitizer 46 and a second digitizer 48), a digital delay device 50, two comparators (a first comparator 52 and a second comparator 54), and a signal generator 56. The first signal input port 42 is used to receive a first analog detection signal A1 and the second signal input port 44 is used to receive a second analog detection signal A2.

Please also refer to FIG. 2. The four detecting sections A, B, C, D of the optical sensor 30 can be used to respectively generate four corresponding output signals a, b, c, d, according to corresponding portions of the optical beam. If there is a deviation between the optical spot and the data track, there are time differences between the output signals a, b, c, d. For clarifying the degree of the deviation, a first analog detection signal A1 is set as a sum of the output signal a and the output signal c (A1=a+c), and a second analog detection signal A2 is set as a sum of the output signal b and the output signal d (A2=b+d). Please continue to refer to FIG. 3. The first signal input port 42 and the second signal input port 44, which are respectively connected to first digitizer 46 and second digitizer 48, are respectively used to transform the first analog detection signal A1 and the second analog detection signal A2 into a first digital detection signal D1 and a second digital detection signal D2.

Please refer to FIG. 4 that is a time sequence diagram showing variations of a plurality of signals generated in FIG. 3. As shown in FIG. 4, there is a time difference Δ between the first digital detection signal D1 and the second digital detection signal D2, and the time difference Δ represents the deviation between the optical spot and the data track.

Please return to FIG. 3. The digital delay device 50 is electrically connected to the first digitizer 46 for digitally delaying the first digital detection signal D1 with a delay time Td to generate a digital delay signal DR. Afterwards, the digital delay signal DR and the first digital detection signal D1 will pass through the first comparator 52 to generate a first digital comparing signal DC1. The first comparator 52 can be an XOR (Exclusive OR) logic gate and mainly used to extract front edges and rear edges of the digital delay signal DR and the first digital detection signal D1. Similarly, the digital delay signal DR and the second digital detection signal D2 pass through the second comparator 54 (an XOR logic gate) to generate a second digital comparing signal DC2, and the first digital comparing signal DC1 and the second digital comparing signal DC2 are both shown in FIG. 4. The first comparator 52 and the second comparator 54 are jointly connected to the signal generator 56. The signal generator 56 can be used to subtract the first digital comparing signal DC1 from the second digital comparing signal DC2 to generate a time-difference signal DT.

According to the time-difference signal DT, the related circuitry can discriminate the relationship between the first digital detection signal D1 and the second digital detection signal D2 in time domain. As shown in FIG. 4, the time-difference signal DT is a negative voltage value that represents that the first digital detection signal D1 transcends the second digital detection signal D2. Afterwards, the signal generator 56 can be used to process the time-difference signal DT to generate the tracking error signal TE. Therefore, the optical spot emitted from the optical pick-up head 12 shown in FIG. 1 can dynamically move along the track direction shown by the arrow mark 34 in FIG. 2 according to the tracking error signal TE.

Another structure disclosed in prior art patents is shown in FIG. 5, which is a functional block diagram of a tracking error signal generator 60. The difference between the embodiment of FIG. 5 and that of FIG. 3 is that the FIG. 5 embodiment includes four signal input ports 62. Without executing a signal combination process, the four signal input ports 62 directly and respectively receive the four corresponding output signals a, b, c, d generated by the four detecting sections A, B, C, D of the optical sensor 30 shown in FIG. 2. The four corresponding output signals a, b, c, d can be respectively treated as a first analog detection signal A1, a second analog detection signal A2, a third analog detection signal A3, and a fourth analog detection signal A4 in the tracking error signal generator 60. Except for the above-mentioned difference, all the other characteristics of this embodiment, including the all digital operations, are the same as in the previous one.

The tracking error signal generator 60 further includes four digitizers 64, which are respectively electrically connected to the four signal input ports 62 and are used for respectively transforming the first analog detection signal A1, the second analog detection signal A2, the third analog detection signal A3, and the fourth analog detection signal A4 into a first digital detection signal D1, a second digital detection signal D2, a third digital detection signal D3, and a fourth digital detection signal D4. The embodiment shown in FIG. 5 includes two first digitizers 70 used for respectively delaying the first digital detection signal D1 and third digital detection signal D3 into a first digital delay signal DR1 and a third digital delay signal DR3. Similar to FIG. 3, four comparators 68 (XOR logic gate) can be used. The first digital delay signal DR1 can be compared with the first digital detection signal D1 to generate a first digital comparing signal DC1. The first digital delay signal DR1 can also be compared with the second digital detection signal D2 to generate a second digital comparing signal DC2. The third digital delay signal DR3 can be compared with the third digital detection signal D3 to generate a third digital comparing signal DC3. In addition, the third digital delay signal DR3 can be compared with the fourth digital detection signal D4 to generate a four digital comparing signal DC4. Finally, a signal generator 66 will operate an adding/subtracting combination on the four digital comparing signals (in this embodiment, the adding/subtracting combination of the four digital comparing signals can be described as: DC2+DC4−DC1−DC3) to generate the tracking error signal TE.

Although the above-mentioned prior art structures and methods for generating the tracking error signal TE are widely used, there is still room for improvement. First of all, in the embodiment shown in FIG. 3, only the first digital detection signal D1 is delayed by the first digitizer 50, and the delayed first digital detection signal D1 is used as a comparing criterion for the first digital detection signal D1 and the second digital detection signal D2. That is, the above-mentioned prior art neglects to put the second digital detection signal D2 into consideration when operating related delaying and comparing operations. Therefore, in some specific circumstances, the above-mentioned neglect will lead to an imbalance effect between signals. The imbalance effect will be aggravated in the embodiment shown in FIG. 5.

In addition, when the optical drive changes its rotational speed, the frequency of an RF signal reproduced by the optical sensor 30 shown in FIG. 2 (the RF signal can be treated as a sum of the four output signals a, b, c, d shown in FIG. 2) will be correspondently changed, and the delay time of the first digitizer (50, 70) should be correspondently adjusted. Therefore, both the first digitizer 46 shown in FIG. 3 and the first digitizer 64 shown in FIG. 5 should be externally or internally installed with a tuning circuit to adjust the delay time according to the frequency of the RF signal. The installation of the tuning circuit, which is difficult for digital circuitry and is likely to increase the area of the first digitizer, is a great burden for the tracking error signal generator and the whole optical storage system.

SUMMARY OF THE INVENTION

It is therefore a primary objective of the claimed invention to provide a method and related apparatus for deriving a tracking error signal based on a first analog detection signal and a second analog detection signal and to solve the above-mentioned problems.

In the claimed invention, an analog delay device is used to achieve a signal delay operation. The analog delay device can be an equalizer electrically connected to a digitizer, a relay, or an equalizer electrically connected to relay. Therefore, there is no need for installation of a tuning circuit to adjust the delay time. Moreover, combined with a synthesizer of the present invention, the optical sensor can generate a plurality of corresponding analog detection signals according to different detecting sections, and all of the analog detection signals corresponding to different portions of a light beam will be transmitted to the analog delay device. Therefore, all of the analog detection signals are in consideration when operating related delaying and comparing operations to erase an imbalance effect and to reduce the sensitivity for the delay time in the structure of the present invention.

According to the claimed invention, a method for deriving a tracking error signal based on a first analog detection signal and a second analog detection signal includes summing the first analog detection signal and the second analog detection signal into an analog sum signal. An analog delay device is used to delay the analog sum signal into a delay signal. The delay signal is digitized into a digital delay signal. The first analog detection signal and the second analog detection signal are respectively transformed into a first digital detection signal and a second digital detect signal. The digital delay signal is then compared with the first digital detection signal and the digital delay signal is then compared with the second digital detection signal to generate the tracking error signal.

According to the claimed invention, a method for deriving a tracking error signal in an optical storage system includes receiving an optical beam reflected and refracted via a recording carrier, the optical beam propagating along a track direction on the recording carrier according to the tracking error signal. According to a plurality of received different portions of the optical beam in space, a first analog detection signal and a second analog detection signal are generated where there is a time difference between the first analog detection signal and the second analog detection signal. The first analog detection signal and the second analog detection signal are respectively transformed into a first digital detection signal and a second digital detect signal. The first analog detection signal and the second analog detection signal are summed into an analog sum signal. A delay operation is applied to the analog sum signal to be a delay signal. The delay signal is then digitized into a digital delay signal and respectively compared with the first digital detection signal and compared with the second digital detection signal to generate the tracking error signal.

According to the claimed invention, a tracking error signal generator used in an optical storage system for generating a tracking error signal includes two signal processing ports for respectively providing a first analog detection signal and a second analog detection signal where there is a time difference between the first analog detection signal and the second analog detection signal. A synthesizer is electrically connected to the two signal processing ports for synthesizing the first analog detection signal and the second analog detection signal into an analog sum signal. An analog delay device is electrically connected to the synthesizer for delaying and digitalizing the analog sum signal into a digital delay signal. Two digitizers are electrically connected to the two signal processing ports for respectively transforming the first analog detection signal and the second analog detection signal into a first digital detection signal and a second digital detect signal. A comparing module is electrically connected to the analog delay device and the two digitizers for respectively comparing the digital delay signal with the first digital detection signal and comparing the digital delay signal with the second digital detection signal to generate the tracking error signal.

According to the claimed invention, a tracking error signal generator includes four signal processing ports for respectively providing a first analog detection signal, a second analog detection signal, a third analog detection signal, and a fourth analog detection signal. A synthesizer is electrically connected to the four signal processing ports for synthesizing the first analog detection signal, the second analog detection signal, the third analog detection signal, and the fourth analog detection signal into an analog summing signal. An analog delay device is electrically connected to the synthesizer for delaying and digitalizing the analog summing signal into a digital delay summing signal. Four digitizers are respectively electrically connected to the four signal processing ports for respectively transforming the first analog detection signal, the second analog detection signal, the third analog detection signal, and the fourth analog detection signal into a first digital detect signal, a second digital detect signal, a third digital detect signal, and a fourth digital detect signal. A comparing module is electrically connected to the analog delay device and the four digitizers for applying a comparing operation to the digital delay summing signal respectively with the first digital detect signal, the second digital detect signal, the third digital detect signal, and the fourth digital detection signal to generate the tracking error signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
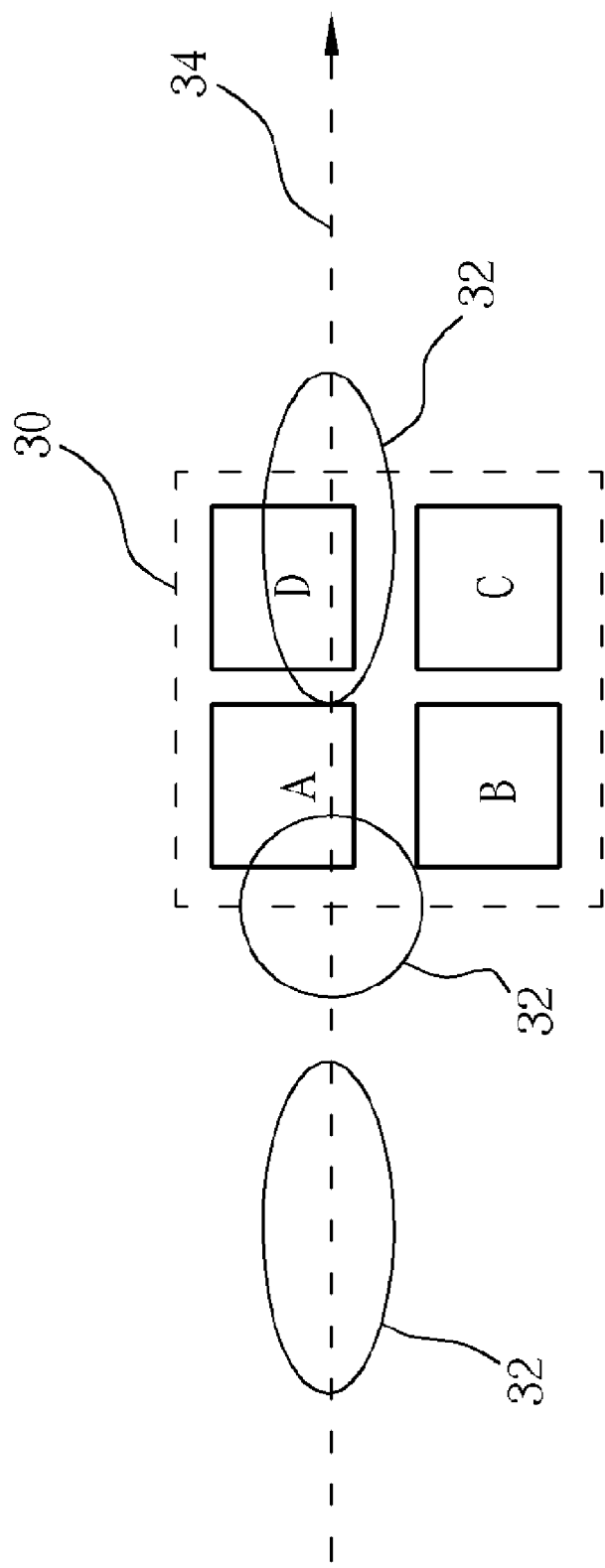
FIG. 2 is a schematic diagram showing a spatial relationship between a data track on the optical disk shown in FIG. 1 and an optical sensor of the pick-up head.

The method and structure of the present invention is based on the structure of the optical sensor 30 (for generating a tracking error signal TE) in the above-mentioned prior art embodiment shown in FIG. 2. Please refer to FIG. 6, which is a functional block diagram of an embodiment of a tracking error signal generator 80 according to the present invention.

The tracking error signal generator 80 is used in an optical storage system for generating a tracking error signal TE. The tracking error signal generator 80 includes a first signal processing port 82, a second signal processing port 84, a synthesizer 85, an analog delay device 90, a first digitizer 86, a second digitizer 88, and a comparing module 93. The first and second signal processing ports 82, 84 are respectively used to provide a first analog detection signal A1 and a second analog detection signal A2. Regarding the output signals a, b, c, d shown in FIG. 2, the first analog detection signal A1 is equal to a sum of the output signals a and the output signals c (A1=a+c), and the second analog detection signal A2 is equal to a sum of the output signals b and the output signals d (A2=b+d).

When the optical sensor 30 shown in FIG. 2 (in the pick-up head 12 shown in FIG. 1) deviates from the data track, there is a time difference between the first analog detection signal A1 and the second analog detection signal A2. One characteristic of the tracking error signal generator 80 according to the present invention is a synthesizer 85 electrically connected to the two signal processing ports 82, 84. The synthesizer 85 can be used to synthesize the first analog detection signal A1 and the second analog detection signal A2 into an analog sum signal MA.

In addition, another important characteristic of the present invention is the installation of an analog delay device 90. The analog delay device 90, which is electrically connected to the synthesizer 85, can be used to delay/digitalize the analog sum signal MA into a digital delay signal DR. The first and second digitizers 86, 88, which are respectively electrically connected to the two signal processing port 82, 84, can be used to respectively transform the first analog detection signal A1 and the second analog detection signal A2 into a first digital detection signal D1 and a second digital detection signal D2. Afterwards, the digital delay signal DR and the first digital detection signal D1 will pass through the comparing module 93, and in the meantime, the digital delay signal DR and the second digital detection signal D2 will also pass through the comparing module 93 to a comparing operation to generate the tracking error signal TE.

Please notice that the major characteristic of the tracking error signal generator 80 of the above-mentioned embodiment is to extract the time difference between the two analog detection signals (the first analog detection signal A1 and the second analog detection signal A2) to generate the tracking error signal TE. Therefore, the first analog detection signal A1 and the second analog detection signal A2 can be generated by any combination of the output signals a, b, c, d. That is, the combination of the output signals a, b, c, d (for generating the first analog detection signal A1 and the second analog detection signal A2) is only required to truly represent the deviation between a central spot of the optical beam (emitted from the optical sensor 30) on the recording carrier and the track direction.

Similarly, the tracking error signal generator 80 of the present invention is also suitable for other the optical sensors, such as a six-dimensional sensor, in addition to the four-dimensional sensor. Moreover, the synthesizer 85 of the present embodiment can be an adder for summing the first analog detection signal A1 and the second analog detection signal A2 to put these two analog detection signals into consideration of the related analog delay operation executed by the analog delay device 90.

Please notice that, the analog delay device 90 of the present invention can be implemented by an equalizer electrically connected to a digitizer, a relay, or an equalizer electrically connected to the relay. When being practically implemented, the equalizer, which can improve signal quality, is an initial element in the optical storage system of the present invention. Utilizing the equalizer to achieve the analog delay device 90 of the present invention can be used to adjust the delay time according to the frequencies of signals and saves circuitry area of the analog delay device 90. Moreover, the relay can also be used to adjust the delay time according to a predetermined voltage potential.

Figure 1:
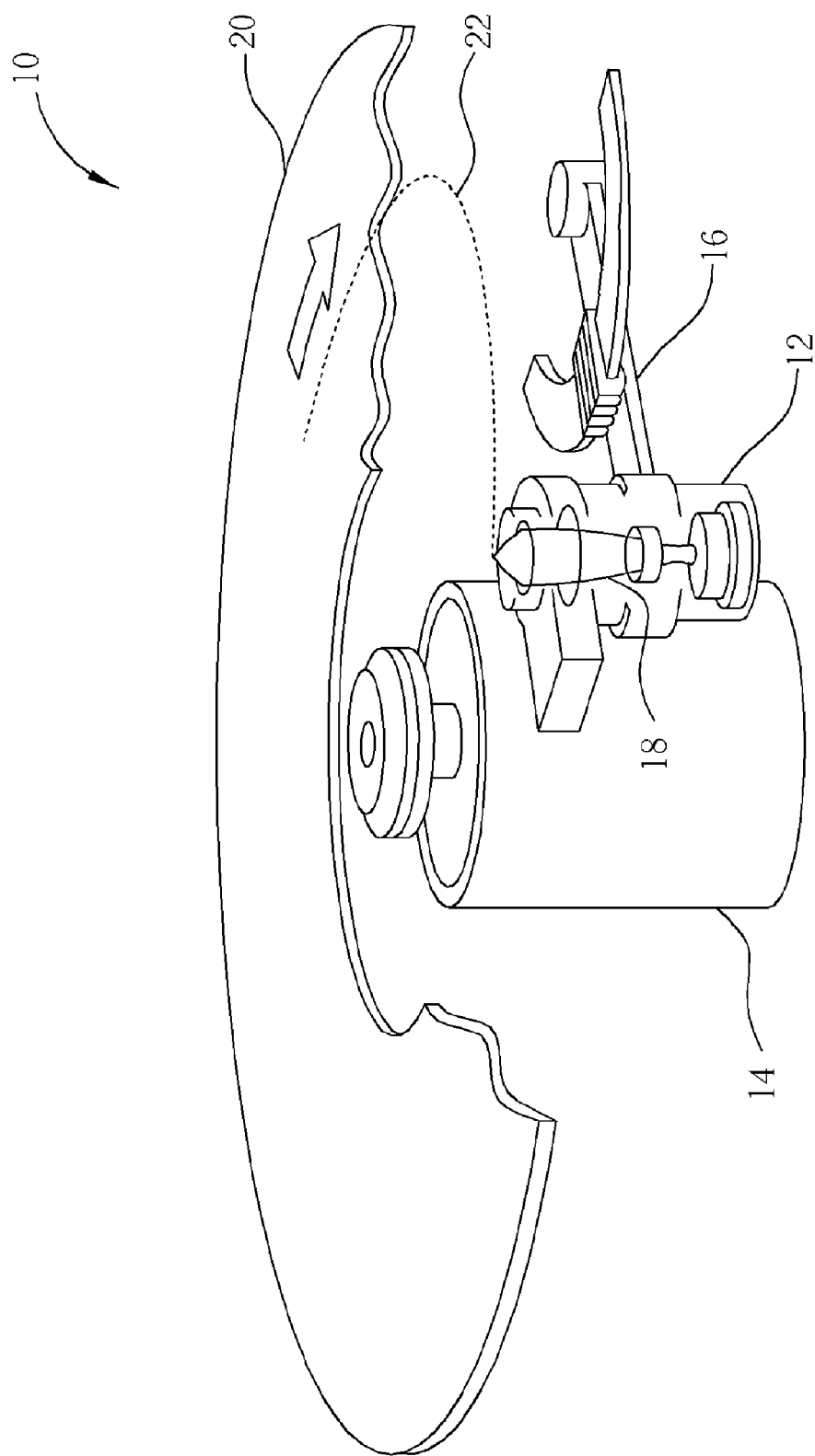
FIG. 1 is a schematic diagram of a typical optical drive.

Therefore, when the frequency of signals read from a recording carrier (as the optical disk 20 as shown in FIG. 1) is high (the corresponding period is short in time domain), the determined delay time is short. Similarly, when the frequency of signals read from the recording carrier is low (the corresponding period is long in time domain), the determined delay time will be long. Thus, the analog delay device 90 implemented by a relay can dynamically determine corresponding proper delay times according to the frequencies of signals even in the high frequency domain.

Figure 3:
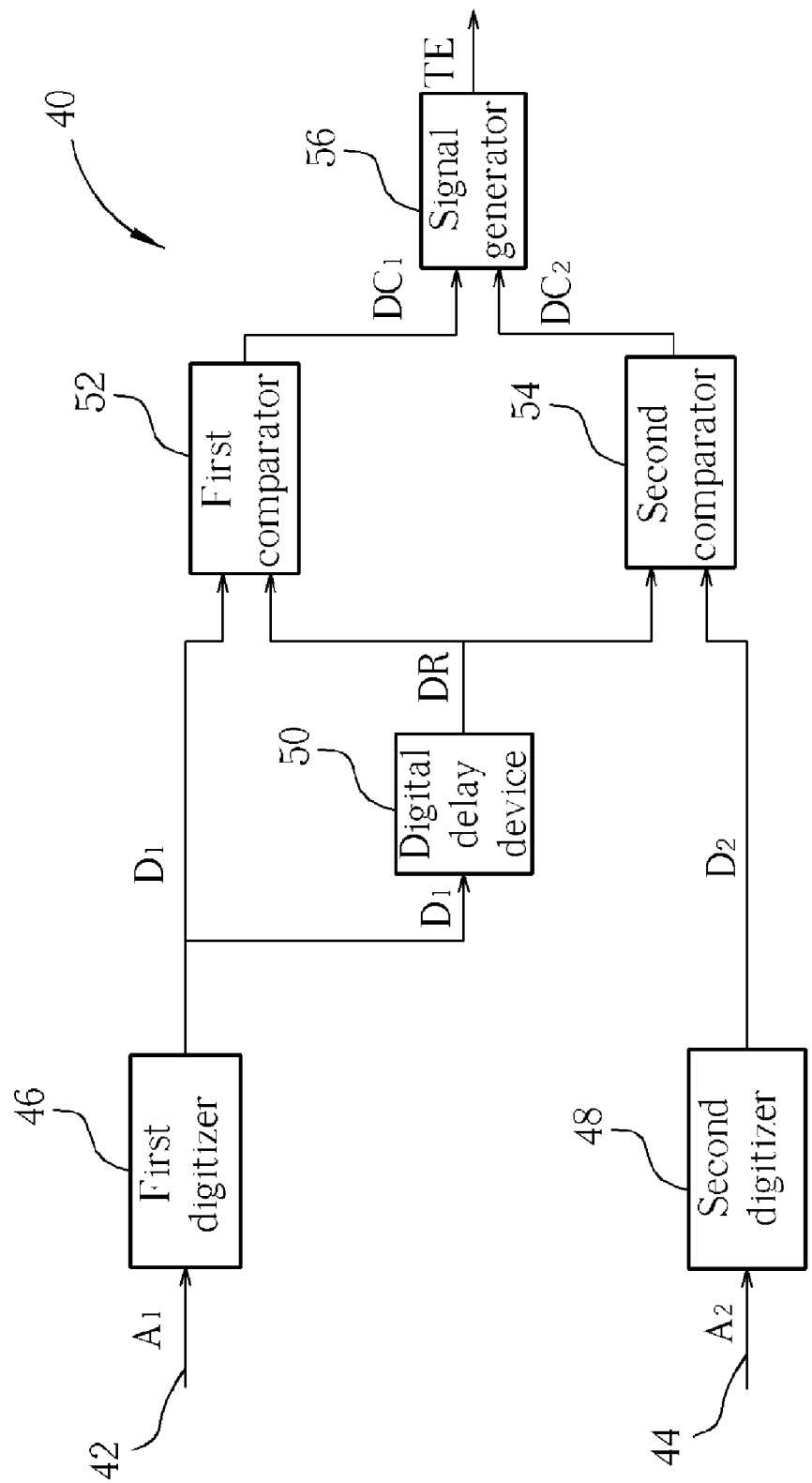
FIG. 3 is a functional block diagram of a tracking error signal generator according to the prior art.
Figure 4:
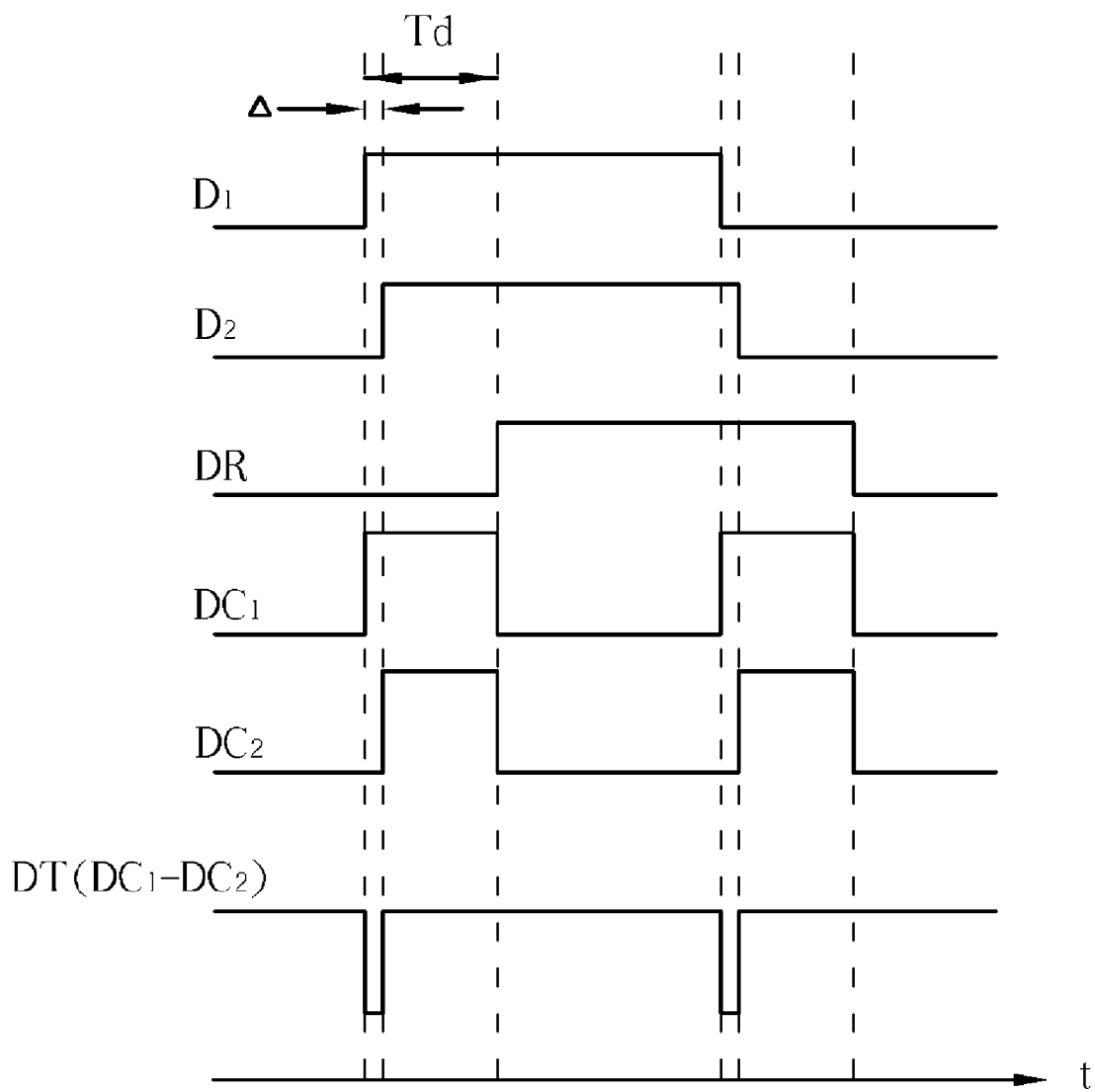
FIG. 4 is a time sequence diagram showing variations of a plurality of signals generated by the device of FIG. 3.

Compared to the prior art technique shown in FIG. 3, the tracking error signal generator 80 of the present embodiment can be treated as a mixed mode tracking error signal generator 80, which is implemented in neither a totally digital way nor a totally analog way. In brief, the mixed mode tracking error signal generator 80 of the present invention utilizes analog delay operations to simplify the signal delay operations and applies a digital signal operation to raise the accuracy of the generated tracking error signal TE.

Figure 6:
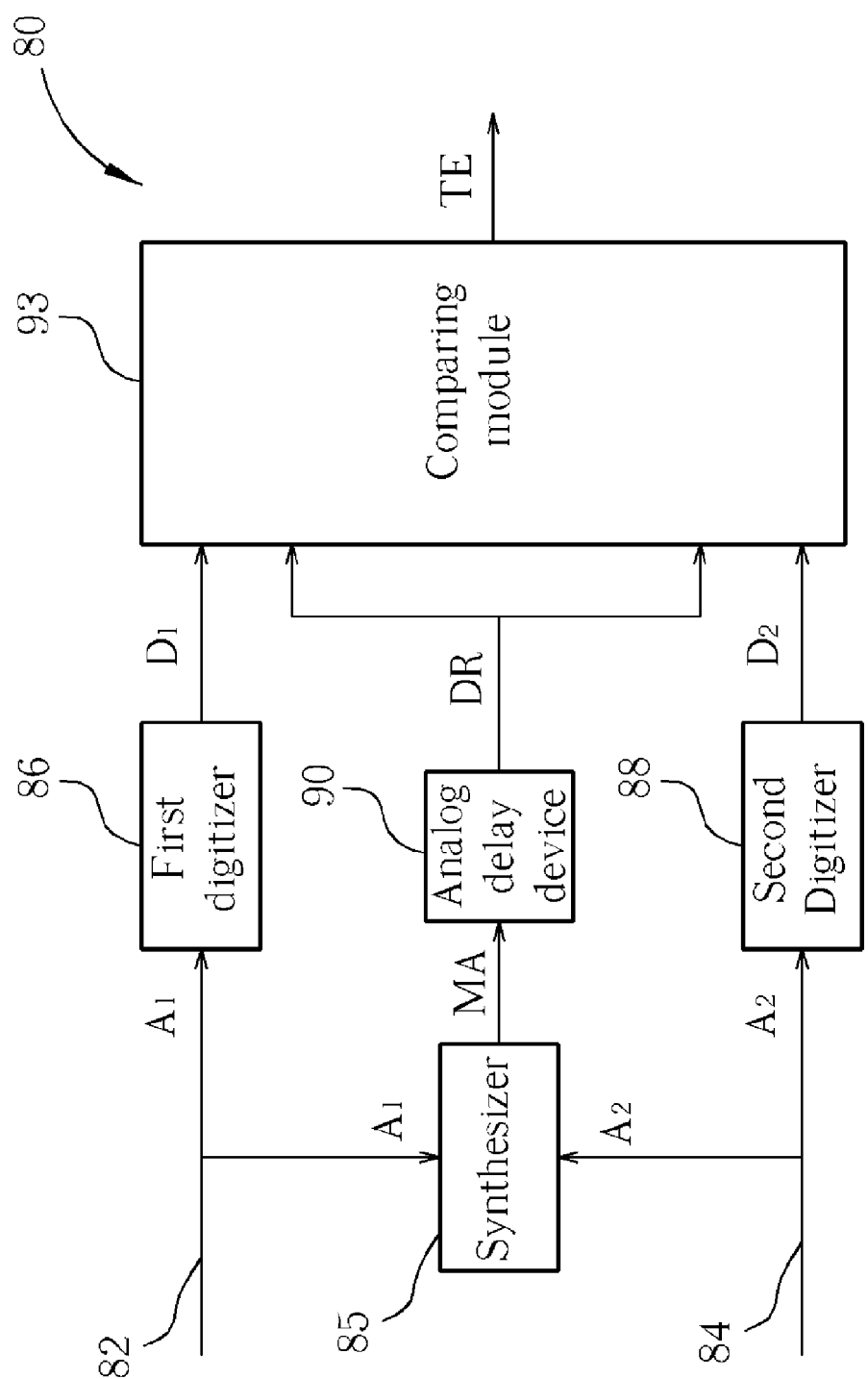
FIG. 6 is a functional block diagram of an embodiment of a tracking error signal generator according to the present invention.
Figure 7:
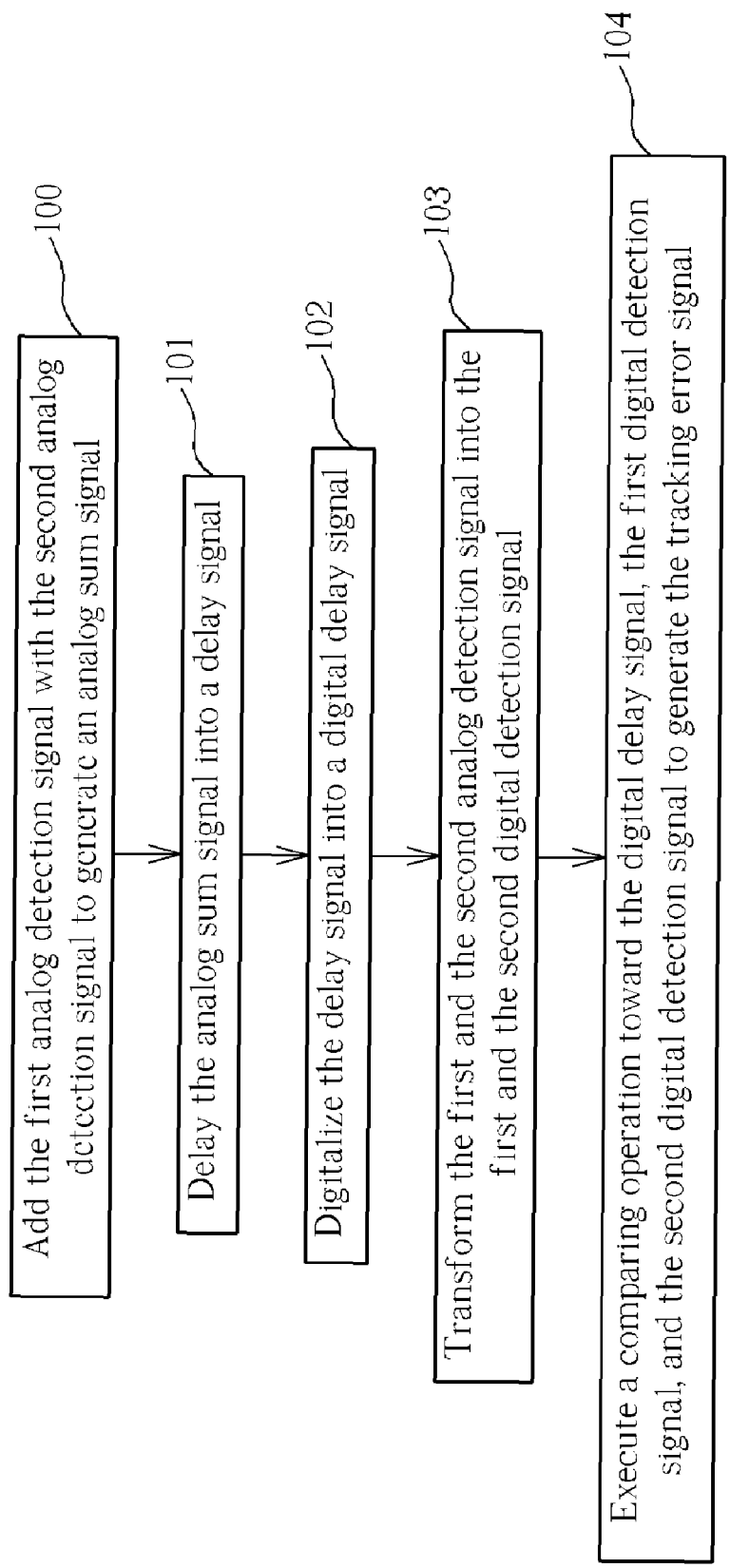
FIG. 7 is a flow chart of a method embodiment according to the present invention.

According to the tracking error signal generator 80 in the above-mentioned embodiment shown in FIG. 6, the present invention utilizing the first analog detection signal A1 and the second analog detection signal A2 to generate the tracking error signal TE can be implemented with the following steps. Please refer to FIG. 7, which is a flow chart of a method embodiment according to the present invention.

Step 100: Add the first analog detection signal A1 with the second analog detection signal A2 to generate an analog sum signal MA.

Step 101: Utilize the analog delay device 90 to delay the analog sum signal MA into a delay signal AR.

Step 102: Digitalize the delay signal AR into a digital delay signal DR.

Step 103: Respectively transform the first analog detection signal A1 and the second analog detection signal A2 into the first digital detection signal D1 and the second digital detection signal D2.

Step 104: Execute a comparing operation (in the comparing module 93) toward the digital delay signal DR and the first digital detection signal D1, and in the meantime, execute a comparing operation (in the comparing module 93) toward the digital delay signal DR and the second digital detection signal D2 to generate the tracking error signal TE.

Figure 9:
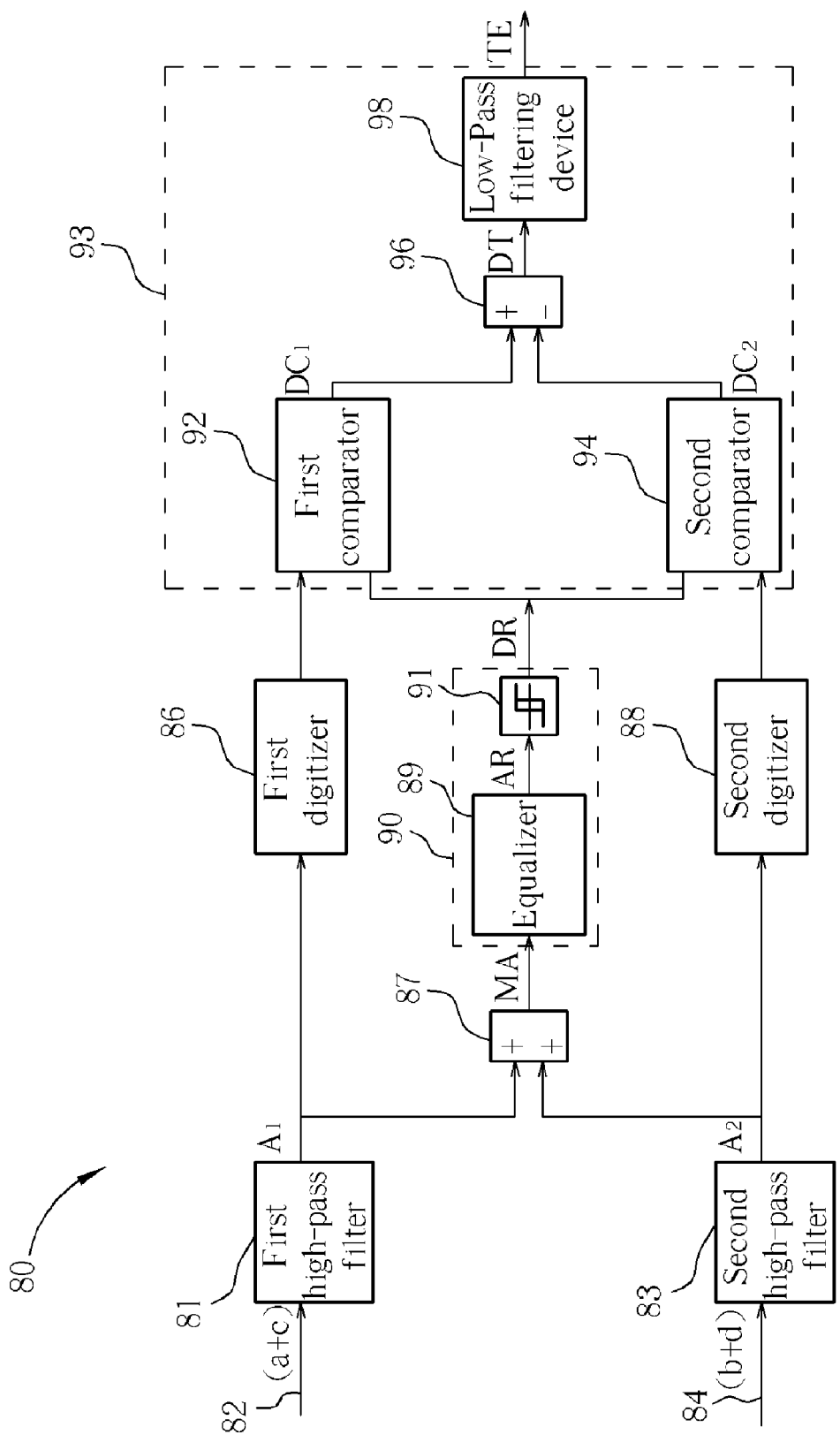
FIG. 9 is a functional block diagram showing a detailed embodiment of the tracking error signal generator shown in FIG. 6.

Please refer to FIG. 9, which is a functional block diagram showing a detailed embodiment of the tracking error signal generator 80 shown in FIG. 6 to get a clear and detailed view of the inner operations of the tracking error signal generator 80 of the present invention. The first signal processing port 82 is used to transmit the output signal (a+c) (generated from the optical sensor 30 shown in FIG. 2) to a first high-pass filter 81 to filter out the low-frequency noise and to get the first analog detection signal A1. The formula corresponding to the above-mentioned operation is: $A1=G_{hp1}(a+c)$, where $G_{hp1}$ is the transformation function of the first high-pass filter 81. Similarly, the second signal processing port 84 can be used to transmit the output signal (b+d) (generated from the optical sensor 30 shown in FIG. 2) to a second high-pass filter 83 to generate the second analog detection signal A2. The corresponding operation formula is: A2=$G_{hp2}$(b+d), where $G_{hp2}$ is the transformation function of the second high-pass filter 83 ($G_{hp2}$ can be the same as or different to $G_{hp1}$).

Figure 8:
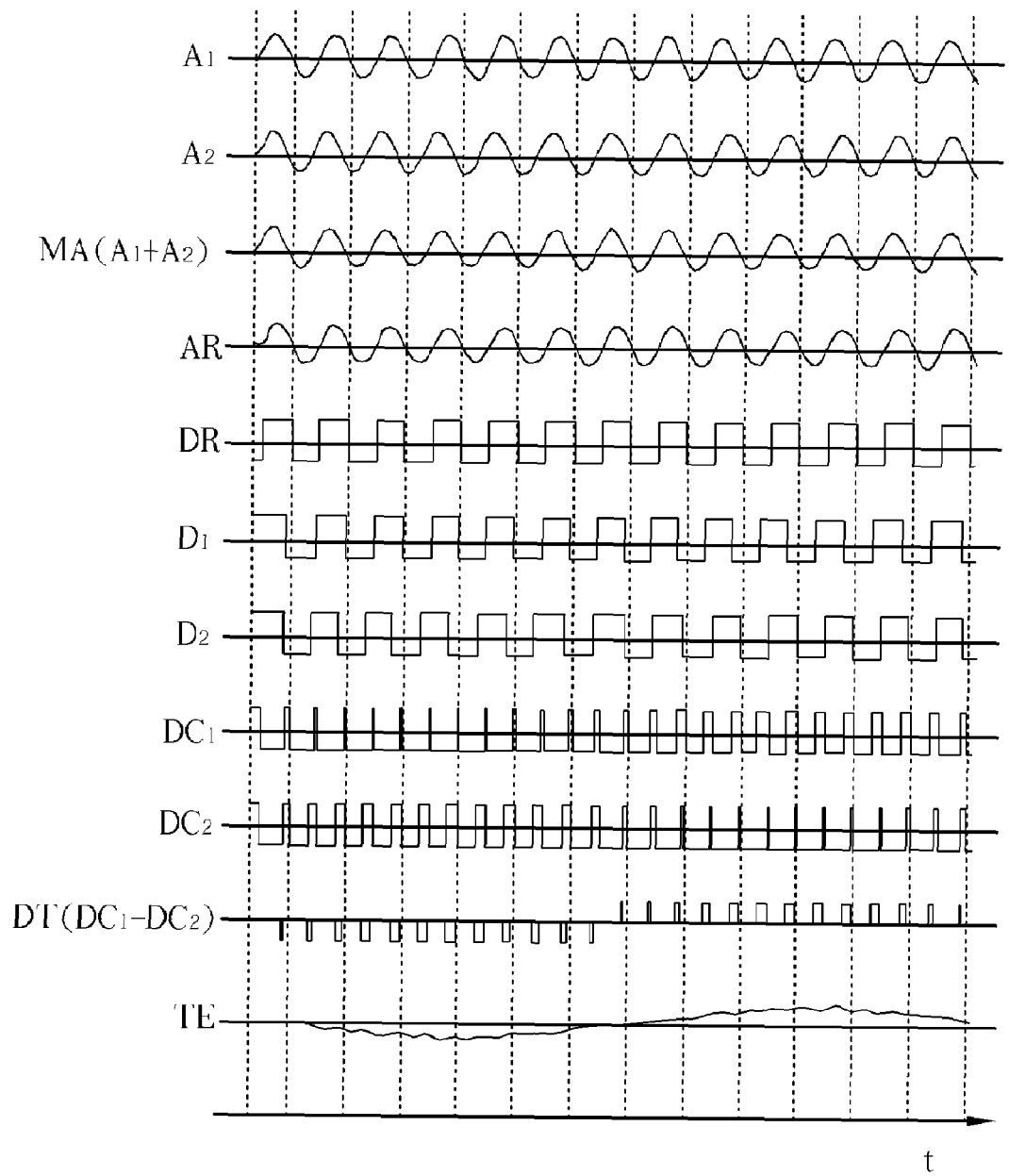
FIG. 8 is a time sequence diagram showing variations in time domain of a plurality of signals generated by the device shown in FIG. 6.

Please refer to FIG. 8, which is a time sequence diagram showing variations in time domain of a plurality of signals generated by an embodiment of the present invention illustrated in FIG. 9. The plurality of signals include the first analog detection signal A1, the second analog detection signal A2, the analog sum signal MA, the delay signal AR, the digital delay signal DR, the first digital detection signal D1, the second digital detection signal D2, a first comparing signal DC1, a second comparing signal DC2, a time-difference signal DT, and the tracking error signal TE. The synthesizer 85 shown in FIG. 6 is implemented by an adder 87 in FIG. 9, and the analog sum signal MA generated by the sum of the first and the second analog detection signal A1, A2 in the adder 87 (a normalized operation is also executed) is also shown in FIG. 8. The first and second digitizer 86, 88 can be used to respectively transform the first and the second analog detection signal A1, A2 into the first digital detection signal D1 and the second digital detection signal D2, and the corresponding operation formulas can be respectively described as follows:

$$D1 = \begin{cases} 1 & A1 \geq 0 \\ 0 & A1 < 0; \end{cases} \quad D2 = \begin{cases} 1 & A2 \geq 0 \\ 0 & A2 < 0 \end{cases}$$

The analog delay device 90 of the present embodiment includes the equalizer 89 and the relay 91, and the analog sum signal MA (MA=A1+A2) will be transformed into the delay signal AR after being operated on by the equalizer 89. The corresponding operation formula is: AR=$f$(A1,A2,$\Delta\tau$)= $G_{eq}$(A1+A2)=|$G_{eq}$|$e^{js\Delta\tau}$(A1+A2), where $G_{eq}$ is the transformation function the equalizer 89, and $\Delta\tau$ is the delay time of the equalizer 89). After being operated by the relay 91, the delay signal AR becomes the digital delay signal DR, and the corresponding operation formula is:

$$DR = \begin{cases} 1 & AR \geq a \\ 0 & AR < -a \end{cases}$$

where a is a predetermined voltage potential. The delay signal AR and the digital delay signal DR are all shown in FIG. 8. The comparing module 93 includes a first comparator 92, a second comparator 94, an operator 96, and a low-pass filtering device 98.

The first comparator 92 and the second comparator 94 are respectively XOR ( Exclusive OR) logic gates used for respectively extracting front edges and rear edges of the two input signals (the digital delay signal DR and the first digital detection signal D1, the digital delay signal DR, and the second digital detection signal D2). The digital delay signal DR and the first digital detection signal D1 will pass the first comparator 92 to generate the first comparing signal DC1 (the corresponding operation formula is: DC1=D1 xor DR). The digital delay signal DR and the second digital detection signal D2 will pass the second comparator 94 to generate the second comparing signal DC2 (the corresponding operation formula is: DC2=D2 xor DR). The operator 96 can be used to subtract the first comparing signal DC1 from the second comparing signal DC2 to generate the time-difference signal DT. Afterwards, the time-difference signal DT will pass the low-pass filtering device 98 to generate the tracking error signal TE, and the corresponding operation formula is: TE=$G_{lpf}$(DC1−DC2), where $G_{lpf}$ is the transformation function of the low-pass filtering device 98.

After clarifying the major characteristics of the present invention, some important embodiments of the present invention will be introduced as follows. Please refer to FIG. 10, which is a functional block diagram showing another embodiment of a tracking error signal generator 100 according to the present invention. Different from the embodiment shown in FIG. 6, the present embodiment includes four signal processing ports 102 for respectively directly receiving the output signals a, b, c, and d of the optical sensor 30 shown in FIG. 2 and for assigning the four output signals a, b, c, and d respectively as a first analog detection signal A1, a second analog detection signal A2, a third analog detection signal A3, and a fourth analog detection signal A4.

The tracking error signal generator 100 of the present embodiment further includes a synthesizer 105, an analog delay device 110, four digitizers 104, and a comparing module 113. The synthesizer 105 is electrically connected to the four signal processing ports 102 and used to synthesize the first analog detection signal A1, the second analog detection signal A2, the third analog detection signal A3, and the fourth analog detection signal A4 into an analog summing signal AS. The analog delay device 110 is electrically connected to the synthesizer 105 for digitalizing/delaying the analog summing signal AS into a digital delay summing signal DSR. In the meantime, the four digitizers 104, which are electrically connected to the four signal processing ports 102, can be used to respectively transform the first analog detection signal A1, the second analog detection signal A2, the third analog detection signal A3, and the fourth analog detection signal A4 into a first digital detection signal D1, a second digital detection signal D2, a third digital detection signal D3, and a fourth digital detection signal D4. Finally, the comparing module 113 will perform a comparing operation respectively on the digital delay summing signal DSR and the first digital detection signal D1, the digital delay summing signal DSR and the second digital detection signal D2, the digital delay summing signal DSR and third digital detection signal D3, and the digital delay summing signal DSR and the fourth digital detection signal D4 to generate the tracking error signal TE.

Figure 5:
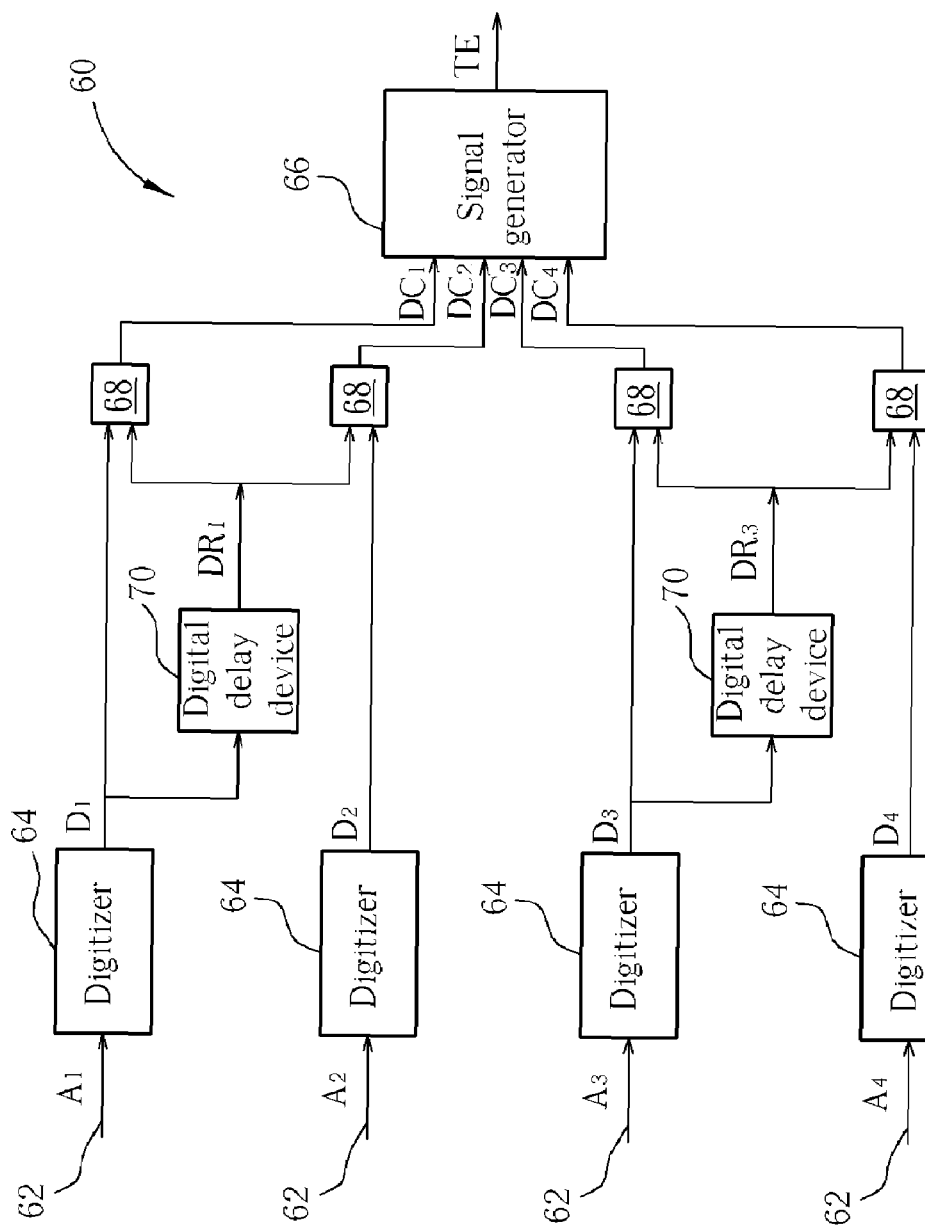
FIG. 5 is another functional block diagram of a tracking error signal generator according to the prior art.

In brief, the characteristics of the present embodiment are similar to those shown in FIG. 6. Compared to the prior art shown in FIG. 5, the present embodiment, which synthesizes/sums a plurality of analog detection signals generated from the corresponding different detecting sections of the optical sensor 30 shown in FIG. 2 and then delays and compares all those analog detection signals, can significantly improve the imbalance effect present in the prior art technique. In addition, utilizing the equalizer or/and the relay to achieve the analog delay device 110 can reduce the sensitivity required for estimating the accurate delay times in the present invention. Moreover, the analog delay device 110 of the present invention occupies less circuitry area than the tuning circuit (combined with the digitizer) of the prior art.

Figure 10:
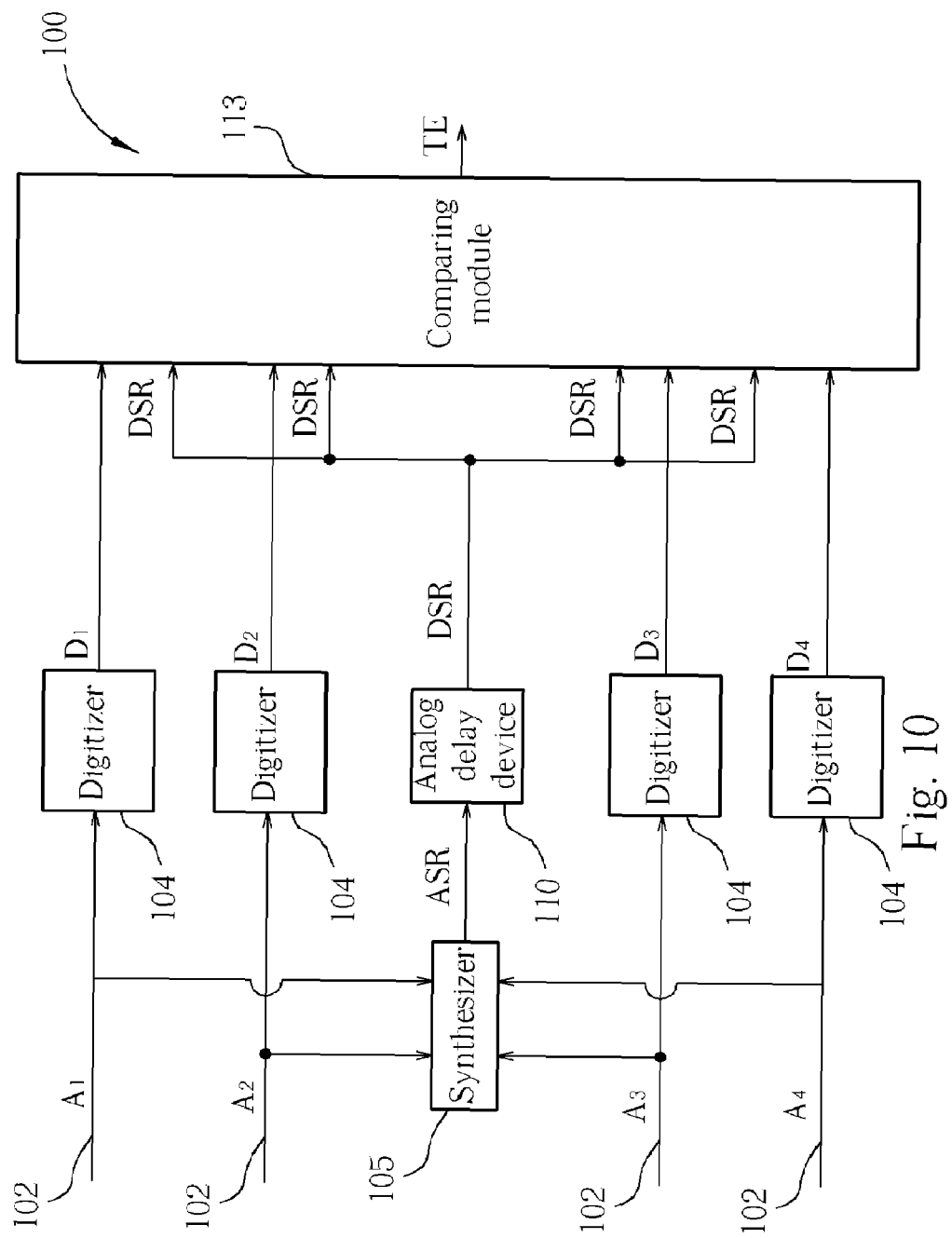
FIG. 10 is a functional block diagram showing another embodiment of a tracking error signal generator according to the present invention.
Figure 11:
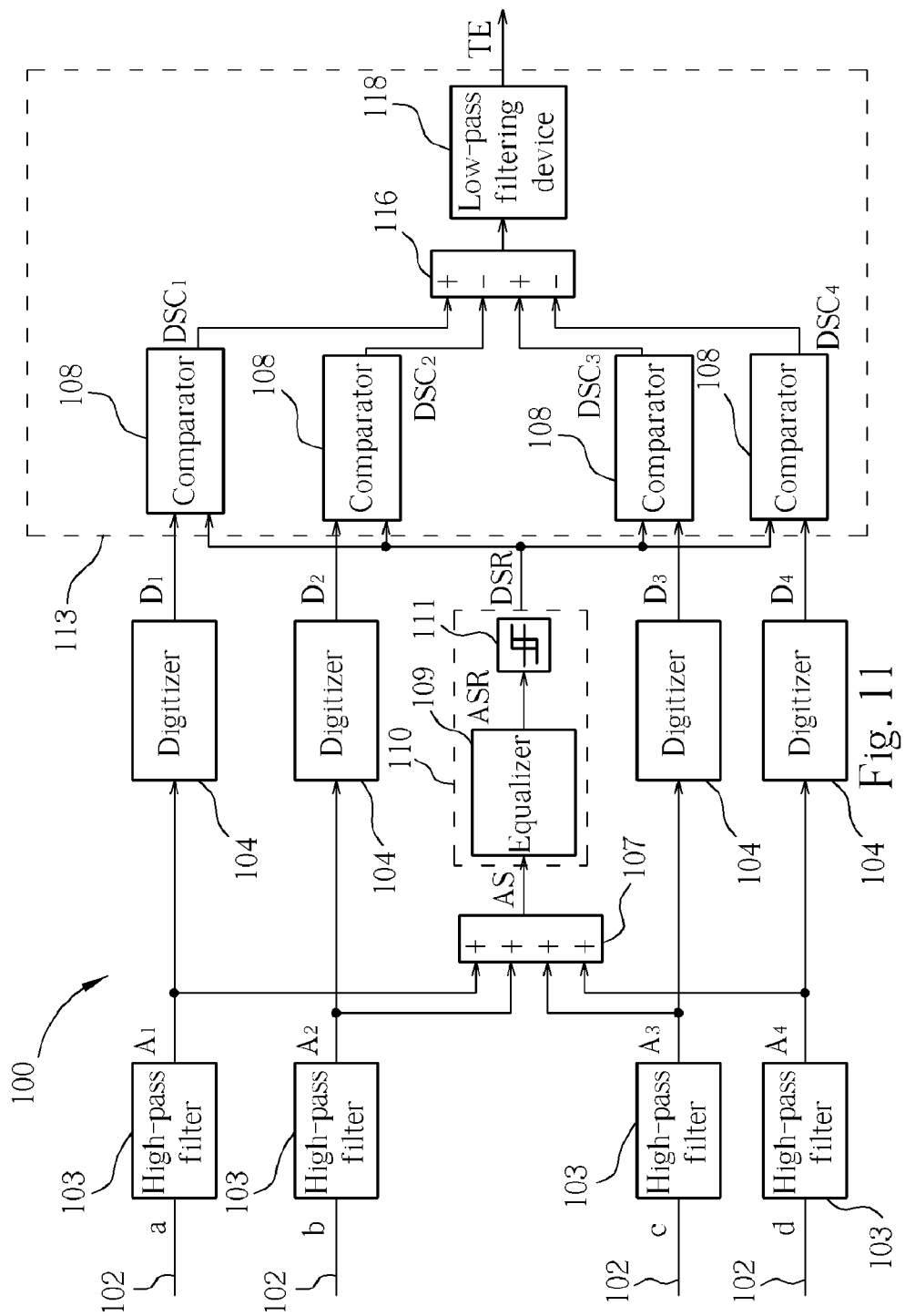
FIG. 11 is a functional block diagram of a detailed embodiment of the embodiment shown in FIG. 10.

Please refer to FIG. 11, which is a functional block diagram of a detailed embodiment of the embodiment shown in FIG. 10. The four signal processing ports 102 can be used to respectively receive the output signals a, b, c, d from the optical sensor 30 shown in FIG. 2 and to transmit the output signals a, b, c, d to the four high-pass filters 103 to filter out the low-frequency noise. The first analog detection signal A1, the second analog detection signal A2, the third analog detection signal A3, and the fourth analog detection signal A4 are thus generated. The corresponding operation formulas are respectively: A1=$G_{hp}$(a); A2=$G_{hp}$(b); A3=$G_{hp}$(c); A4=$G_{hp}$(d), where $G_{hp}$ is the transformation function of the four high-pass filters 103. When being practically implemented, the transformation functions of the four high-pass filters 103 are not required to be the same. Afterwards, the adder 107 shown in FIG. 11, namely the synthesizer 105 shown in FIG. 10, can be used to sum the first analog detection signal A1, the second analog detection signal A2, the third analog detection signal A3, and the fourth analog detection signal A4 into an analog summing signal AS.

The analog delay device 110 of the present embodiment also includes an equalizer 109 and a relay 111. The equalizer 109 can be used to delay the analog summing signal AS into a delay summing signal ASR. The corresponding operation formula is: ASR=$f$(A1,A2,A3,A4,$\Delta\tau$)=$G_{eq}$(A1+A2+A3+A4)=$|G_{eq}|e^{js\Delta\tau}$(A1+A2+A3+A4), where $G_{eq}$ is the transformation function of the equalizer 109 and $\Delta\tau$ is the delay time of the equalizer 109. The delay summing signal ASR will then pass the relay 111 to generate the digital delay summing signal DSR. The corresponding operation formula is:

$$DSR = \begin{cases} 1 & ASR \geq a \\ 0 & ASR < -a \end{cases}$$

where a is a predetermined voltage potential.

In the meantime, the four digitizers 104 respectively transform the first, second, third, and fourth analog detection signals A1~A4 into the first digital detection signal D1, the second digital detection signal D2, the third digital detection signal D3, and the fourth digital detection signal D4. The corresponding operation formulas can be respectively described as follows:

$$D1 = \begin{cases} 1 & A1 \geq 0 \\ 0 & A1 < 0; \end{cases} D2 = \begin{cases} 1 & A2 \geq 0 \\ 0 & A2 < 0; \end{cases} D3 = \begin{cases} 1 & A3 \geq 0 \\ 0 & A3 < 0; \end{cases} D4 = \begin{cases} 1 & A4 \geq 0 \\ 0 & A4 < 0 \end{cases}$$

The comparing module 113 includes four comparators 108, an operator 116, and a low-pass filtering device 118. The four comparators 108 can be XOR logic gates for respectively extracting front edges and rear edges of the two input signals. The digital delay summing signal DSR and the first digital detection signal D1 will be compared to generate a first compare summing signal DSC1. The corresponding operation formula is: DSC1=D1 xor DSR. The digital delay summing signal DSR and the second digital detection signal D2 will be compared to generate a second compare summing signal DSC2. The corresponding operation formula is: DSC2=D2 xor DSR. The digital delay summing signal DSR and the third digital detection signal D3 will be compared to generate a third compare summing signal DSC3. The corresponding operation formula is: DSC3=D3 xor DSR. The digital delay summing signal DSR and the fourth digital detection signal D4 will be compared to generate a fourth compare summing signal DSC4. The corresponding operation formula is: DSC4=D4 xor DSR.

The operator 116 can be used to add the first compare summing signal DSC1 with the third compare summing signal DSC3, and to subtract from the second compare summing signal DSC2 and the fourth compare summing signal DSC4. Finally, the calculated result of the operator 116 will be transmitted to the low-pass filtering device 118 to generate the tracking error signal TE, and the corresponding operation formula is: TE=$G_{lpf}$(DSC1−DSC2+DSC3−DSC4), where $G_{lpf}$ is the transformation function of the low-pass filtering device 118.

Figure 12:
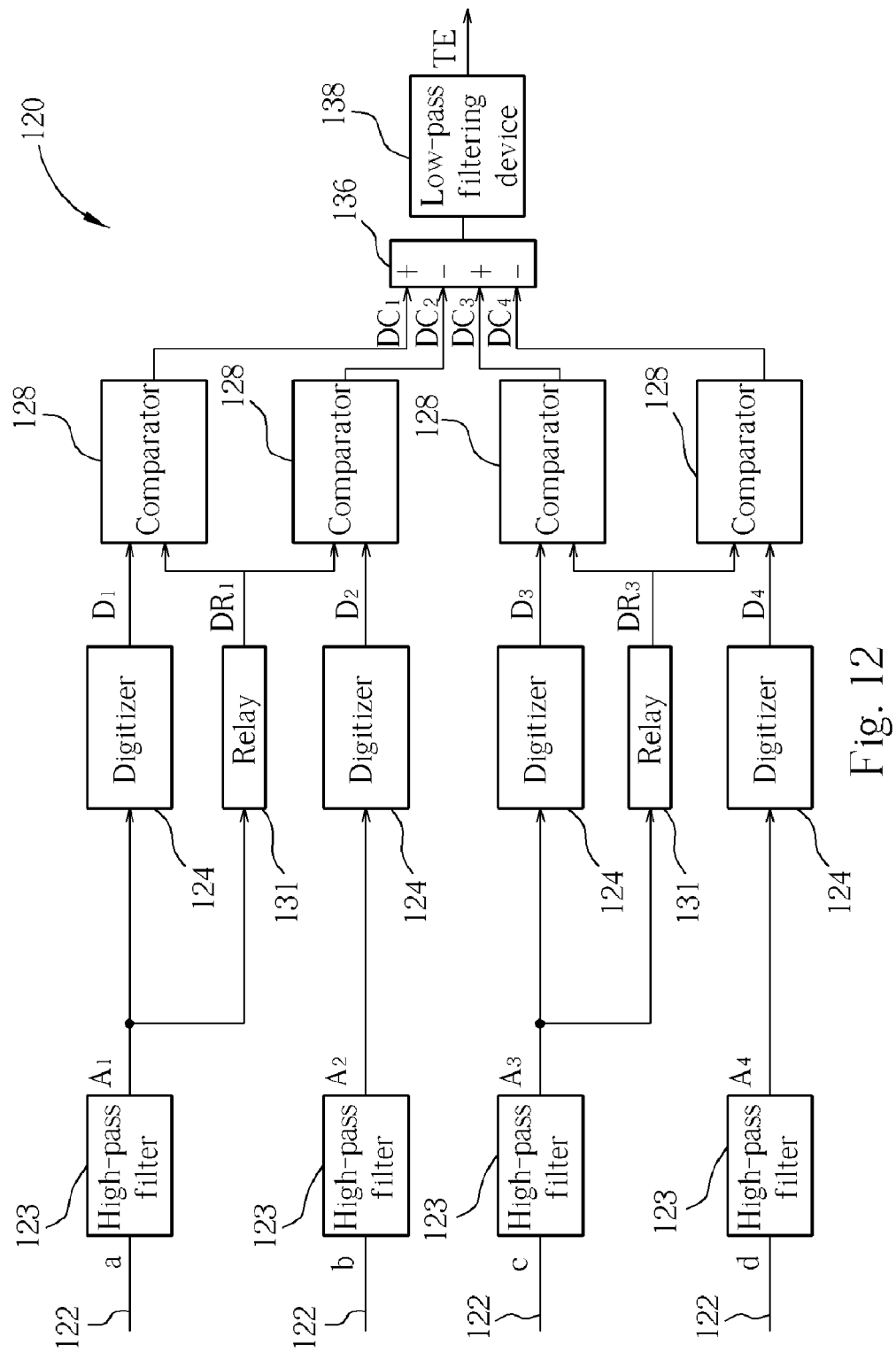
FIG. 12 is a functional block diagram showing another embodiment of the tracking error signal generator according to the present invention.

Please refer to FIG. 12, which is a functional block diagram showing another embodiment of a tracking error signal generator 120 according to the present invention. The present embodiment emphasizes implementing an analog delay device 130 with only a relay 131. The basic structure is similar to the prior art embodiment shown in FIG. 5, while the present embodiment inherits the characteristics of the present invention. The present embodiment still utilizes a mixed mode for implementing delay/compare operations instead of a totally digital way or a totally analog way to improve the prior art technique.

Similar to the embodiment shown in FIG. 11, four signal processing ports 122 respectively receive the output signals a, b, c, d generated from the optical sensor 30 shown in FIG. 2 and respectively pass the four output signals to four high-pass filters 123 to filter out the low-frequency noise to get the first analog detection signal A1, the second analog detection signal A2, the third analog detection signal A3, and the fourth analog detection signal A4. The corresponding operation formulas are respectively: A1=$G_{hp}$(a); A2=$G_{hp}$(b); A3=$G_{hp}$(c); A4=$G_{hp}$(d), where $G_{hp}$ is the transformation function of the four high-pass filters 123. The tracking error signal generator 120 of the present embodiment includes four digitizers 124, which are respectively electrically connected to the four signal processing ports 122 for respectively transforming the first, the second, the third, and the fourth analog detection signals A1~A4 into the first digital detection signal D1, the second digital detection signal D2, the third digital detection signal D3, and the fourth digital detection signal D4. The corresponding operation formulas are respectively described as follows:

$$D1 = \begin{cases} 1 & A1 \geq 0 \\ 0 & A1 < 0; \end{cases} D2 = \begin{cases} 1 & A2 \geq 0 \\ 0 & A2 < 0; \end{cases} D3 = \begin{cases} 1 & A3 \geq 0 \\ 0 & A3 < 0; \end{cases} D4 = \begin{cases} 1 & A4 \geq 0 \\ 0 & A4 < 0. \end{cases}$$

The present embodiment includes two relays 131. The relays 131 can be used to simply and dynamically determine proper delay times for different frequencies of signals and to digitalize the related delayed analog signals. Thus the two relays 131 can be used to respectively delay the first analog detection signal A1 and the third analog detection signal A3 into a first delay detection signal AR1 and a third delay detection signal AR3. The two relays 131 then respectively digitalize the first delay detection signal AR1 and third delay detection signal AR3 into a first digital delay detection signal DR1 and a third digital delay detection signal DR3. The corresponding operation formulas are $$DR1 = \begin{cases} 1 & A1 \geq a \\ 0 & A1 < -a \end{cases}$$

$$DR3 = \begin{cases} 1 & A3 \geq a \\ 0 & A3 < -a \end{cases}$$

where a is a predetermined voltage potential.

Afterwards, four comparators 128 (XOR logic gates) can be used as follows. The first digital delay detection signal DR1 is compared with the first digital detection signal D1 to generate a first digital comparing signal DC1 (formula: DC1=D1 xor DR1). The first digital delay detection signal DR1 is compared with the second digital detection signal D2 to generate a second digital comparing signal DC2 (formula: DC2=D2 xor DR1). The third digital delay detection signal DR3 is compared with the third digital detection signal D3 to generate a third digital comparing signal DC3 (formula: DC3=D3 xor DR3). And, the third digital delay detection signal DR3 is compared with the fourth digital detection signal D4 to generate a fourth digital comparing signal DC4 (the corresponding operation formula is: DC4=D4 xor DR3). An operator 136 will then operate a mathematical combination on the four digital comparing signals (DC1+DC3−DC2−DC4), and finally a low-pass filtering device 138 can generate the tracking error signal TE. The corresponding operation formula is: TE=$G_{lpf}$(DC1−DC2+DC3−DC4), where $G_{lpf}$ is the transformation function of the low-pass filtering device 138.

The time-difference extracting method and the tracking error signal generator of the present invention are suitable for various kinds of optical sensors, such as a multi-dimensional sensor, and various types of recording carriers, such as high-density or multi-layer optical disks. In contrast to the prior art techniques, first, the present invention sums all the analog detection signals generated by the optical sensor and puts all those analog detection signals into the consideration when operating related delaying and comparing operations to erase an imbalance effect.

In addition, the present invention utilizes one or a plurality of analog delay devices to achieve analog signal delay operations. In the disclosed embodiments of the present invention, utilizing the initially installed equalizer (electrically connected to a digitizer), the relay, or the equalizer electrically connected to the relay to implement the analog delay device can simply and dynamically determine proper delay times for different frequencies of signals. Instead of the prior art technique of a totally digital approach by externally or internally installing a tuning circuit to adjust the delay time, the present invention applies the mixed (analog/digital) method to significantly save circuitry area used for executing related delay operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for deriving a tracking error signal in an optical storage system comprising:
    (a) receiving an optical beam reflected and refracted via a recording carrier, the optical beam propagating along a track direction on the recording carrier according to the tracking error signal;
    (b) after proceeding with step(a), according to a plurality of received different portions of the optical beam in space, generating a first analog detection signal and a second analog detection signal, wherein there is a time difference between the first analog detection signal and the second analog detection signal;
    (c) after proceeding with step(b), respectively transforming the first analog detection signal and the second analog detection signal into a first digital detection signal and a second digital detect signal;
    (d) after proceeding with step(b), summing the first analog detection signal and the second analog detection signal to generate an analog sum signal;
    (e) after proceeding with step(d), applying a delay operation to the analog sum signal to be a delay signal;
    (f) after proceeding with step(e), digitalizing the delay signal into a digital delay signal; and
    (g) after proceeding with step(e) and step(f), respectively comparing the digital delay signal with the first digital detection signal and comparing the digital delay signal with the second digital detection signal to generate the tracking error signal.

2. The method of claim 1 wherein the optical storage system comprises an optical sensor, and the optical sensor comprises a plurality of detecting sections, which respectively correspond to the plurality of portions of the optical beam in space for generating a plurality of corresponding output signals according to the plurality of portions of the optical beam.

3. The method of claim 2 wherein the optical storage system further comprises a detection signal generating module, which is electrically connected to the optical sensor for providing a combination process for the plurality of output signals to generate the first analog detection signal and the second analog detection signal, so that the time difference between the first analog detection signal and the second analog detection signal represents a deviation between a central spot of the optical beam on the recording carrier and the track direction.

4. The method of claim 1 wherein the optical storage system comprises an equalizer for executing the delay operation in step(e).

5. The method of claim 1 wherein the optical storage system comprises a relay for executing the delay operation in step(e).

6. The method of claim 1 wherein the optical storage system comprises an equalizer and a relay, and the equalizer and the relay are electrically connected to each other for executing the delay operation in step(e).

7. The method of claim 1 wherein the optical storage system comprises a first comparator, a second comparator, and a filtering device, the method further comprising:
    (h) in step(g), utilizing the first comparator to process the digital delay signal and the first digital detection signal to generate a first comparing signal, utilizing the second comparator to process the digital delay signal and the second digital detection signal to generate a second comparing signal; and
    (i) in step(g) and after proceeding with step(h), subtracting the first comparing signal from the second comparing signal to generate a time-difference signal, and utilizing the filtering device to process the time-difference signal to generate the tracking error signal.

8. The method of claim 7 wherein the first comparator and the second comparator are respectively an XOR (Exclusive OR) logic gate.

9. The method of claim 1 further comprising:
(j) in step(b), according to the plurality of received portions of the optical beam, generating a third analog detection signal and a fourth analog detection signal;
(k) after proceeding with steps(j), summing the first analog detection signal, the second analog detection signal, the third analog detection signal, and the fourth analog detection signal into an analog summing signal, and applying the delay operation to the analog summing signal to generate a delay summing signal;
(l) after proceeding with step(k), digitalizing the delay summing signal into a digital delay summing signal;
(m) after proceeding with steps(j), respectively transforming the third analog detection signal and the fourth analog detection signal into a third digital detection signal and a fourth digital detect signal; and
(n) after proceeding with step(l) and step(m), applying a plurality of comparing processes to the digital delay summing signal respectively with the first digital detect signal, the second digital detect signal, the third digital detect signal, and the fourth digital detection signal to generate the tracking error signal.

* * * * *